United States Patent Office 3,505,897
Patented Apr. 14, 1970

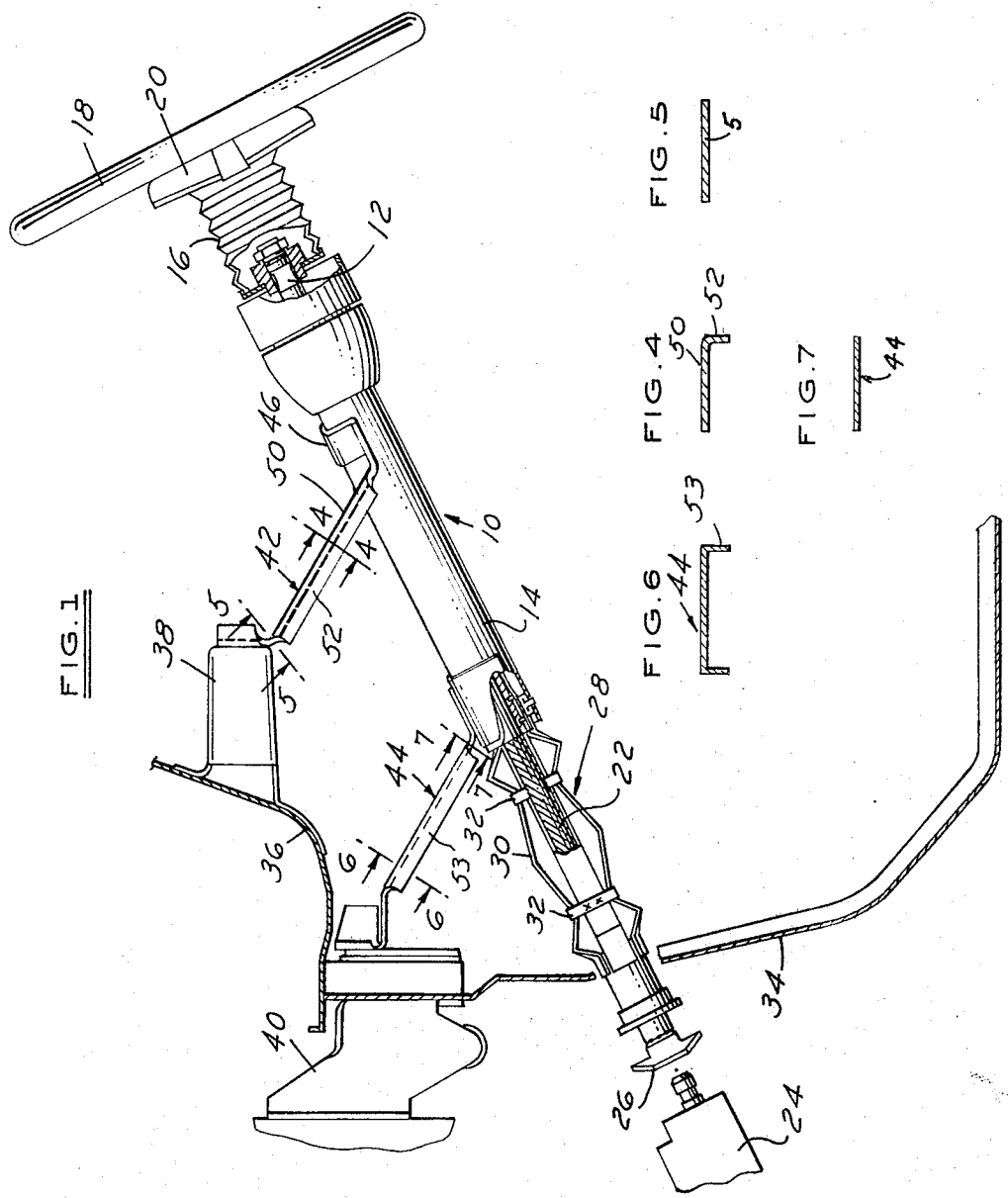

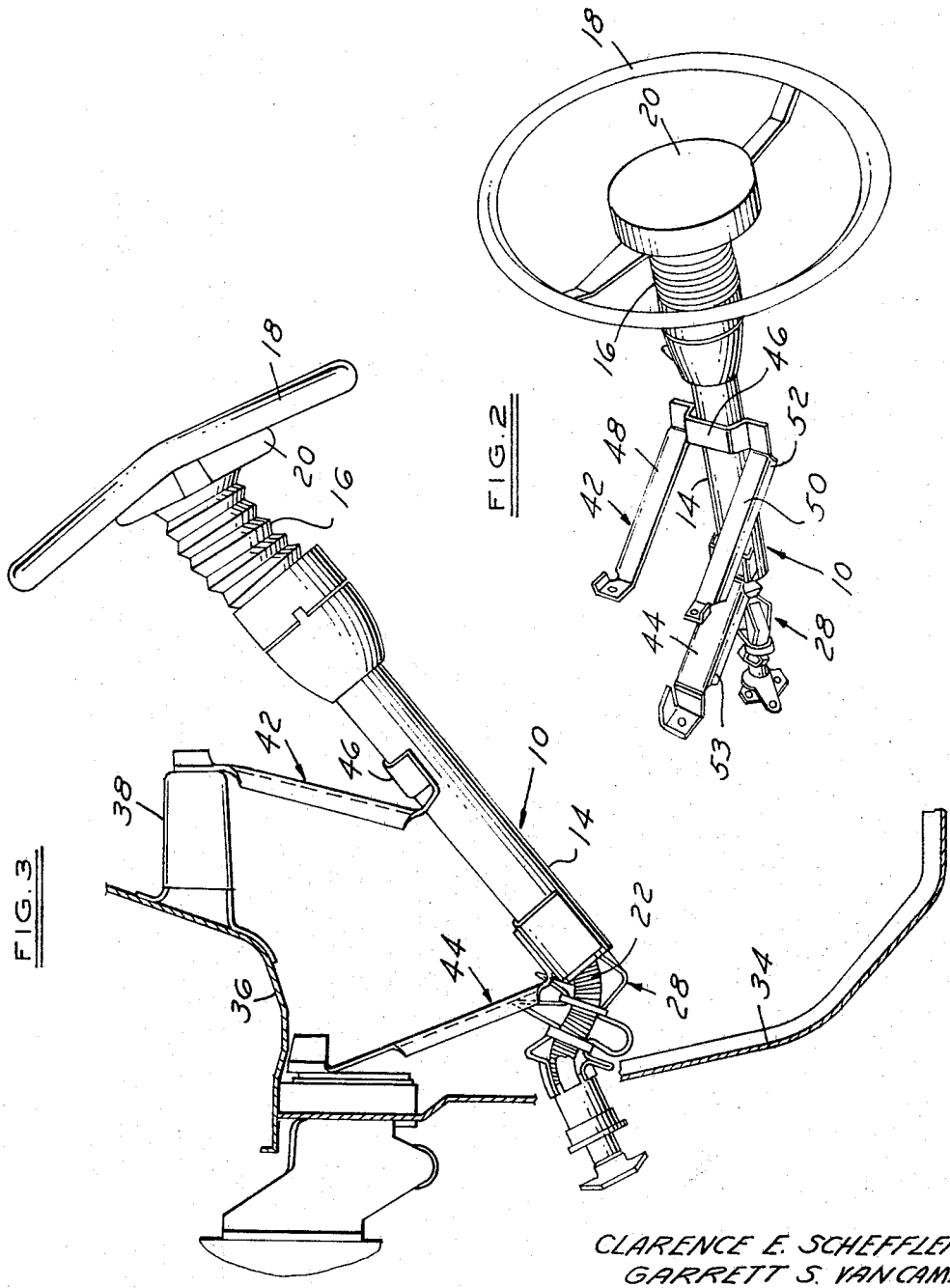

3,505,897
ENERGY ABSORBING STEERING COLUMN
Clarence E. Scheffler, Detroit, and Garrett S. Van Camp, Farmington, Mich., assignors to Ford Motor Company, Dearborn, Mich., a corporation of Delaware
Filed Aug. 27, 1968, Ser. No. 755,689
Int. Cl. B60r 21/02; B62d 1/18
U.S. Cl. 74—492                                                   8 Claims

ABSTRACT OF THE DISCLOSURE

An energy absorbing steering column for a motor vehicle having sheet metal bracket members supporting the column from the instrument panel of the vehicle. The bracket members are constructed to buckle and absorb energy when an impact force is exerted on the upper end of the column.

BACKGROUND OF THE INVENTION

The present invention is related to collapsible columns for motor vehicles and more particularly, to the type of steering column construction that is designed to absorb energy by controlled deformation of the column components when an impact load is exerted against its end.

BRIEF SUMMARY OF THE DISCLOSURE

In accordance with the presently preferred embodiment of the invention, a steering column is supported from the instrument panel of a motor vehicle by means of spaced brackets. The brackets are stamped from sheet metal and are constructed to absorb energy by collapsing or buckling when an impact load is exerted against the end of the column.

The steering shaft within the column has a flexible shaft portion and is enclosed within a collapsible portion of the transmission shift tube. The shift tube and steering shaft are designed to buckle when the column brackets collapse.

BRIEF DESCRIPTION OF THE DRAWINGS

The many objects and advantages of the present invention will become apparent from the following discussion and the accompanying drawings, in which:

FIGURE 1 is a side elevational view, partly in section, of a collapsible steering column constructed in accordance with the present invention;

FIGURE 2 is a perspective view of the steering column support brackets of FIGURE 1;

FIGURE 3 discloses the configuration of the steering column of FIGURE 1 after an impact load has been exerted against the upper end of the column;

FIGURES 4 and 5 are sectional views of the upper column support bracket taken along section lines 4—4 and 5—5 of FIGURE 1; and FIGURES 6 and 7 are sectional views of the lower column support bracket taken along section lines 6—6 and 7—7 of FIGURE 1.

DETAILED DESCRIPTION OF THE DRAWINGS

Referring now to FIGURE 1, a steering column 10 for a motor vehicle is disclosed. The column 10 includes a steering shaft 12 that is rotatably supported within an outer tubular housing 14. A member 16 resembling a corrugated can has its lower end connected to the upper end of the shaft 12. The upper end of the can 16 is secured to a steering wheel 18. A pad covers the connection between the wheel 18 and the can 16.

The corrugated can and steering wheel may be of the type disclosed in U.S. Patent 3,016,764 of Jan. 16, 1962 issued to R. H. Fredericks et al.

The lower end of the steering shaft 12 is connected to a flexible shaft portion 22. Shaft portion 22 has a wire cable type construction. Its lower end is connected to a steering gear 24 by means of a universal joint 26.

A gear shift selector tube is rotatably supported within the tubular housing 14. The upper end of the shift tube is connected to the transmission selector lever which is located adjacent the steering wheel 18. The lower end of the tube is connected to a fabricated collapsible assembly 28. As seen in FIGURES 1 and 2, the assembly 28 comprises longitudinally extending metal straps 30 that are joined together by encircling rings 32. The assembly 28 has its upper end connected to the transmission shift tube and its lower end is connected to the vehicle transmission by means of conventional structure not illustrated.

The metal straps 30 have a zig-zag configuration with spaced apart creases or bends which enhance the collapsibility of the assembly 28.

The vehicle having the steering column 10 has certain body structure including a fire wall 34, an inner body panel 36 and an instrument panel support member 38. A portion of a power brake mechanism 40 is shown supported on the fire wall 34. The upper end of the tubular housing 14 is connected to the instrument support bracket 38 by means of a bracket assembly 42. A bracket assembly 44 connects the lower end of the tube 14 to the fire wall 34.

As seen in FIGURE 2, the upper bracket assembly 42 has a generally U-shape with a connecting portion 46 that extends between two arm members 48 and 50. The connecting portion 46 is welded to the tubular housing 14. The upper ends of the arm portions 48 and 50 are bolted to the instrument support bracket 38. As seen in FIGURE 4, the arm portions 48 and 50 have a generally angular configuration with an edge flange 52 for reinforcement. The side flanges 52 do not extend the full length of the arm portions 48 and 50 whereby the bracket has flat cross sectional configurations as seen in FIGURE 5 adjacent to the connecting portion 46 and to its upper ends.

The lower bracket 44 has side flanges 53 (FIGURE 6) throughout the major portion of its length. Where the bracket 44 is welded to the lower end of the tube 14 the metal is flat and there are no side flanges (see FIGURE 7) Similarly, where the upper end of the bracket 44 is connected to the fire wall 34, the reinforcing edge flanges are absent.

OPERATION

With a collapsible steering column 10 constructed in accordance with the present invention, energy is absorbed when an impact load is exerted against the steering wheel 18 or pad 20. When that load exceeds a certain minimum amount, the steering column 12 will be deflected into the configuration illustrated in FIGURE 3. The supporting brackets 42 and 44 will act in the manner of a linkage system with the brackets folding at their ends adjacent to the place where they are joined to the body structure and to the tubular housing 14.

The major portions of the lengths of the brackets 42 and 44 are reinforced with side flanges so that those portions do not collapse. It is at the ends of the brackets 42 and 44 where the flat sheet metal sections are located. By providing a weaker construction at the ends of the brackets, the brackets 42 and 44 perform in the manner of a linkage system and permit the steering column to move to the position illustrated in FIGURE 3 and to absorb energy while being displaced to that location.

The steering column 10 pivots with the steering wheel end moving forwardly and the lower end moving downwardly and forwardly. In order to permit this movement, the lower end of the steering shaft 12 is provided with the cable section 22 which permits the shaft to flex. In addition, the connecting assembly 28 that is joined to the lower end of the gear shift selector tube and encloses the flexible portion 22 of the shaft 12 is designed to buckle and permit the steering column to be displaced as illustrated.

The corrugated can 16 and the padding of the steering wheel 18 also function to absorb energy.

Therefore, in accordance with the present invention, a steering column construction is provided which collapses upon impact and which absorbs energy. The foregoing description presents the presently preferred embodiment of this invention. Modifications and alteration of the invention may occur to those skilled in the art.

We claim:

1. A collapsible steering column for a motor vehicle having a steering shaft, a steering wheel connected to the upper end of said shaft, a tubular housing surrounding said shaft, vehicle body support structure, bracket means supporting said column on said structure, said bracket means having at least one portion with one end connected to said structure and the other end connected to said housing, said portion being constructed to have substantially less bending strength adjacent said ends than between said ends whereby said bracket means functions in the manner of a linkage system to permit said column to move forwardly when an impact force above a preset minimum amount is exerted against said wheel.

2. A collapsible steering column for a motor vehicle according to claim 1 and including:
said steering shaft having a flexible shaft portion adjacent the lower end of said housing, said flexible portion being constructed to buckle when said impact force is exerted against said wheel.

3. A collapsible steering column for a motor vehicle according to claim 1 and including:
a transmission shift selector tube situated within said housing and surrounding said steering shaft, said vehicle body structure including a fire wall, the lower end of said column extending through said fire wall, said steering shaft having a flexible shaft portion adjacent said first wall, said selector tube having a collapsible portion surrounding said flexible shaft portion, said collapsible portion and said flexible portion being constructed to buckle when said impact force is exerted against said wheel.

4. A collapsible steering column for a motor vehicle including a steering shaft, a steering wheel connected to the upper end of said shaft, a tubular housing surrounding said shaft, vehicle body support structure, spaced brackets supporting said column on said structure, said brackets having portions with one end connected to said structure and the other end connected to said housing, said brackets having flat cross sectional configurations adjacent said ends, said brackets having reinforcing side flanges between its ends, whereby said brackets buckle at their ends and said column moves forwardly when an impact force above a preset minimum amount is exerted against said wheel.

5. A collapsible steering column for a motor vehicle according to claim 4 and including:
said bracket portions being elongated and constructed to function as a linkage system when said impact force is exerted against said wheel.

6. A collapsible steering column for a motor vehicle according to claim 4 and including:
said steering shaft having a flexible shaft portion adjacent its lower end, said flexible portion being constructed to buckle when said impact force is exerted against said wheel.

7. A collapsible steering column for a motor vehicle according to claim 4 and including:
a transmission selector shift tube surrounding said steering shaft, said selector tube having a collapsible portion surrounding said shaft, said collapsible portion being constructed to buckle when said impact force is exerted against said wheel.

8. A collapsible steering column for a motor vehicle according to claim 4 and including:
a collapsible corrugated can connecting said wheel to said shaft, a transmission selector shift tube surrounding said steering shaft, said steering shaft having a flexible shaft portion adjacent its lower end, said selector tube having a collapsible portion surrounding said flexible shaft portion, said collapsible portion and said flexible portion being constructed to buckle when said impact force is exerted against said wheel.

References Cited

UNITED STATES PATENTS 1,425,723   8/1922   Thomas _____ 74—493

MILTON KAUFMAN, Primary Examiner

U.S. Cl. X.R.

180—78; 280—87